(12) United States Patent
Sreeravindra

(10) Patent No.: US 12,200,112 B2
(45) Date of Patent: *Jan. 14, 2025

(54) KEY ROTATION SERVICE

(71) Applicant: Capital One Services, LLC, McLean, VA (US)

(72) Inventor: Bharath Bhushan Sreeravindra, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/965,854

(22) Filed: Oct. 14, 2022

(65) Prior Publication Data

US 2023/0046034 A1 Feb. 16, 2023

Related U.S. Application Data

(63) Continuation of application No. 17/201,747, filed on Mar. 15, 2021, now Pat. No. 11,522,684.

(60) Provisional application No. 63/083,094, filed on Sep. 24, 2020.

(51) Int. Cl.
*H04L 29/06* (2006.01)
*G06F 21/00* (2013.01)
*H04L 9/08* (2006.01)
*H04L 9/32* (2006.01)

(52) U.S. Cl.
CPC .......... *H04L 9/0825* (2013.01); *H04L 9/0861* (2013.01); *H04L 9/0894* (2013.01); *H04L 9/3249* (2013.01); *H04L 9/3252* (2013.01); *H04L 9/3297* (2013.01)

(58) Field of Classification Search
CPC ............... H04L 9/0825; H04L 9/0861; H04L 9/0894; H04L 9/3249; H04L 9/3252; H04L 9/3297; H04L 9/088; H04L 9/0897; H04L 63/068; H04L 9/0891
See application file for complete search history.

(56) References Cited

U.S. PATENT DOCUMENTS

| | | | |
|---|---|---|---|
| 9,002,018 B2 | 4/2015 | Wilkins et al. | |
| 10,469,477 B2 | 11/2019 | Campagna et al. | |
| 10,771,263 B2 | 9/2020 | Smith et al. | |
| 2017/0126404 A1* | 5/2017 | Unagami | H04L 9/3242 |
| 2017/0244687 A1* | 8/2017 | Moulds | H04L 9/0891 |

(Continued)

*Primary Examiner* — Lisa C Lewis
(74) *Attorney, Agent, or Firm* — Sterne, Kessler, Goldstein & Fox P.L.L.C.

(57) ABSTRACT

A system for security key rotation in a cloud computing environment is disclosed. The system performs steps to at least initiate, at a predetermined interval, a call to determine whether to initiate generation of a public-private key pair for a client application. The system determines whether to initiate generation of the public-private key pair for the client application and based on determining to initiate generation of the public-private key pair for the client application, transmits a control signal requesting generation of the public-private key pair The system generates the public-private key pair and transmits a private key associated with the public-private key pair to a secure storage location for later retrieval by the client application and transmits a public key associated with the public-private key pair to a public key service for later retrieval by a client associated with the client application.

20 Claims, 5 Drawing Sheets

(56) References Cited

U.S. PATENT DOCUMENTS

| | | | |
|---|---|---|---|
| 2017/0286698 A1* | 10/2017 | Shetty | H04L 67/10 |
| 2018/0068132 A1* | 3/2018 | Zubair | G06F 21/44 |
| 2018/0270065 A1 | 9/2018 | Brown et al. | |
| 2018/0288024 A1* | 10/2018 | Munafo | G16H 40/67 |
| 2020/0053065 A1 | 2/2020 | Wisniewski et al. | |
| 2020/0106611 A1 | 4/2020 | Bharatam et al. | |
| 2020/0119917 A1 | 4/2020 | Christensen et al. | |
| 2020/0153616 A1* | 5/2020 | Savalle | H04L 9/0891 |
| 2020/0202036 A1* | 6/2020 | Baruch | H04L 63/101 |
| 2021/0385083 A1* | 12/2021 | Lenglet | H04L 9/3213 |
| 2022/0094530 A1 | 3/2022 | Sreeravindra | |

* cited by examiner

KEY ROTATION SERVICE

CROSS REFERENCE TO RELATED APPLICATIONS

This application claims priority to U.S. Provisional Application No. 63/083,094, filed on Sep. 24, 2020, and U.S. application Ser. No. 17/201,747, filed on Mar. 15, 2021, the contents of which are incorporated in their entireties herein by reference.

TECHNICAL FIELD

Embodiments relate to systems and methods for encryption key management, specifically rotation of public-private key pairs in a cloud computing environment.

BACKGROUND

Encrypting/decrypting sensitive data (such as personal identifying information (PII), passwords, etc.) to maintain security over the data is vital for any organization that transmits, receives, or stores such sensitive data. One technology that facilitates security over sensitive data is public key infrastructure (PKI) technology. PKI relies on the use of two related security keys, a public key and a private key (collectively referred to as a public-private key pair), which together are used to encrypt and decrypt data. However, a need still remains for improved architectures using PKI technology in cloud computing environments, specifically where software applications interfacing with the cloud computing environment can use the PKI system implemented in the cloud computing environment to generate public-private key pairs for the software application to encrypt/decrypt sensitive data.

SUMMARY

Embodiments disclosed herein provide systems and methods for security key rotation in a cloud computing environment. The systems and methods improve conventional systems by implementing architectures that allow for generation of PKI public-private key pairs using cloud computing infrastructure. The public-private key pairs can be generated and rotated, or generated on demand to maintain security, and to minimize the impact of data breaches if certain key pairs become compromised. In embodiments, the systems can perform the aforementioned functionality by implementing methods initiate, at a predetermined interval, a call to a key rotation control module to determine whether to initiate generation of a public-private key pair for a client application. In embodiments, the key rotation control module can determine whether to initiate generation of the public-private key pair for the client application. In embodiments, based on determining to initiate generation of the public-private key pair for the client application, the systems can transmit a control signal from the key rotation control module to a key rotation module requesting generation of the public-private key pair. In embodiments, the key rotation module can generate the public-private key pair. In embodiments, the key rotation module can update a database with a timestamp indicating when the public-private key pair was generated for the client application, the timestamp to replace a last time entry indicating when the previous public-private key pair was generated for the client application. In embodiments, the systems can transmit a private key associated with the public-private key pair to a secure storage location for later retrieval by the client application. In embodiments, the systems can transmit a public key associated with the public-private key pair to a public key service module for later retrieval by a client.

In embodiments, the systems can determine whether to initiate generation of a public-private key pair for the client application. In embodiments, the systems can query a database to obtain a product configuration for the client application, wherein the product configuration includes a key rotation period associated with the client application indicating a frequency at which the public-private key pair for the client application is to be generated. In embodiments, the systems determine whether a difference between a last time a previous public-private key pair was generated for the client application and a current time is greater than the key rotation period. In embodiments, the systems, based on determining the difference between the last time the previous public-private key pair was generated for the client application and the current time is greater than the key rotation period initiate generation of the public-private key pair.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

DETAILED DESCRIPTION

Figure 1:
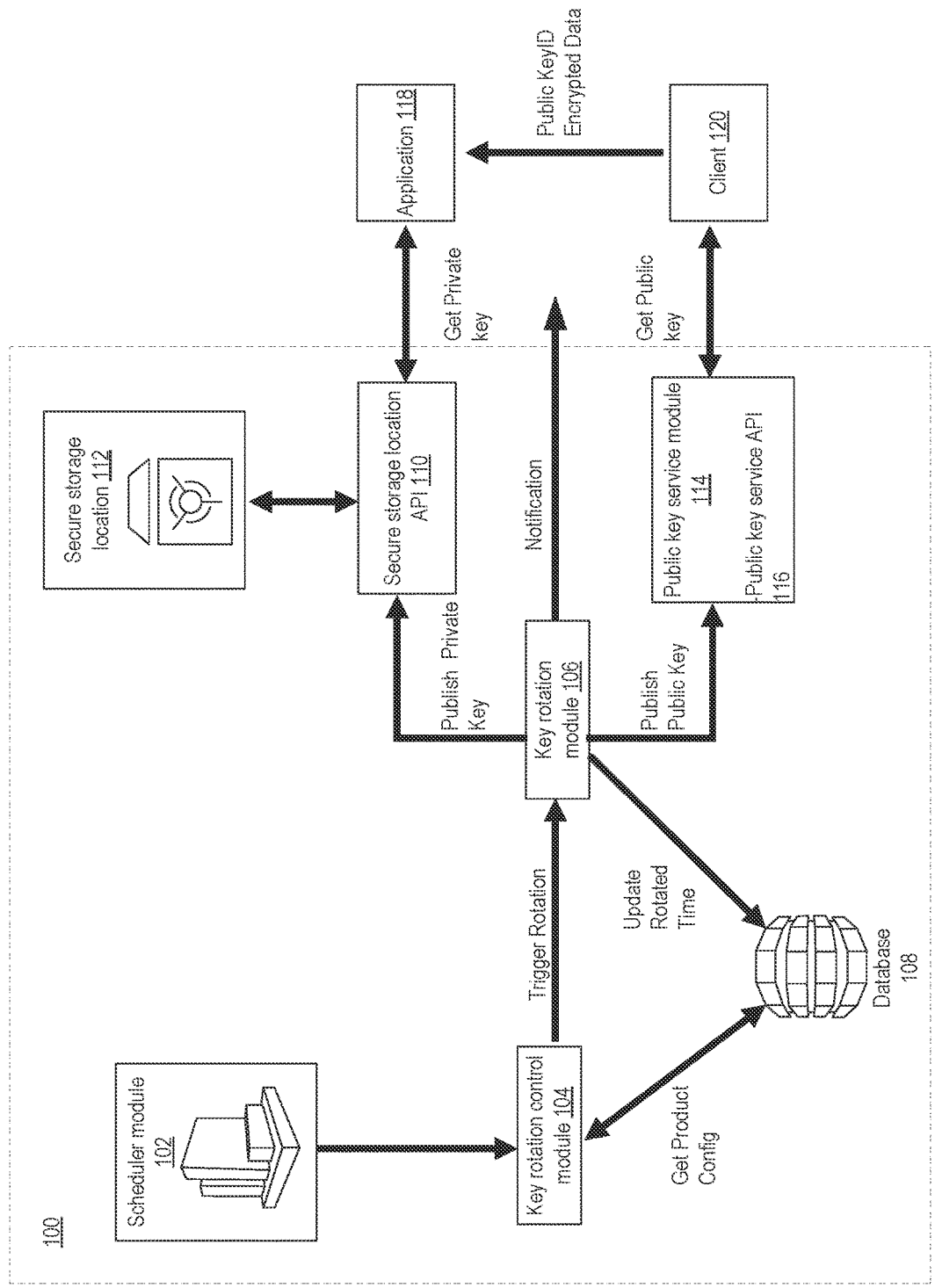
FIG. 1 is a system for security key rotation in a cloud computing environment in an embodiment of the present disclosure.

Embodiments disclosed herein provide a system and method for security key rotation in a cloud computing environment. The system and method includes at least: initiating, by one or more computing devices of the cloud computing environment and at a predetermined interval, a call to a key rotation control module to determine whether to initiate generation of a public-private key pair for a client application. The system and method further includes determining, by the key rotation control module, whether to initiate generation of the public-private key pair for the client application based on: querying a database to obtain a product configuration for the client application, wherein the product configuration includes a key rotation period associated with the client application indicating a frequency at which the public-private key pair for the client application is to be generated; determining whether a difference between a last time a previous public-private key pair was generated for the client application and a current time is greater than the key rotation period; and based on determining the difference between the last time the previous public-private key pair was generated for the client application and the current time is greater than the key rotation period, initiating generation of the public-private key pair. Based on determining to initiate generation of the public-private key pair for the client application, the system and method further includes transmitting, by the one or more computing devices, a control signal from the key rotation control module to a key rotation module requesting generation of the public-private key pair. The key rotation module further generates the public-private key pair and updates the database with a timestamp indicating when the public-private key pair was generated for the client application, the timestamp to replace the last time the previous public-private key pair was generated for the client application. The system and method further includes transmitting, by the one or more computing devices, a private key associated with the public-private key pair to a secure storage location for later retrieval by the client application, and transmitting, by the one or more computing devices, a public key associated with the public-private key pair to a public key service for later retrieval by a client associated with the client application.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in an embodiment of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

System Overview and Function

FIG. 1 shows a system 100 for security key rotation in a cloud computing environment in an embodiment of the present disclosure. In many embodiments, the system 100 may be part of a backend computing infrastructure, including a server infrastructure of a company or institution. The backend computing infrastructure may be implemented in a cloud computing environment. The cloud computing environment may be a public or private cloud service. Examples of a public cloud include Amazon Web Services (AWS), IBM Cloud, Oracle Cloud Solutions, Microsoft Azure Cloud, and Google Cloud, as examples. A private cloud refers to a cloud environment similar to a public cloud with the exception that it is operated solely for a single organization.

The system 100 is used to implement a Public Key Infrastructure (PKI) within the cloud computing environment. Specifically, the system 100 is used to implement key rotation of a PKI public-private key pair for a client application 118 of a client 120 associated with the client application 118. The client application 118 refers to a software application that integrates with the cloud computing environment to provide some functionality. The functionality may be, for example, providing some customer interfacing functionality between the client 120 and the company or institution, for example, facilitating payments to the company or institution, via the cloud computing environment, using the client application 118, in which sensitive financial information such as account numbers and/or passwords are sent back and forth between the client 120, the client application 118, and the cloud computing environment. Other applications can include identity verification using the client application 118, in which sensitive data such as passwords or biometric data used to verify a customer identity are sent back and forth between the client 120, the client application 118, and the cloud computing environment. The aforementioned are merely exemplary and not meant to be limiting of the functionality of the client application 118.

The client 120 refers to an entity to which uses client application 118. For the purposes of discussion, it is assumed that the client 120 is a separate entity from the company or institution. This, however, does not have to be the case, and the client 120 may be a sub-organization, division, or department of the company or institution that implements and/or develops the client application 118. Regardless of the organizational status of the client 120, it is assumed that the client application 118 integrates on top of the cloud computing environment.

Continuing with the example, the purpose of the system 100 is to provide security for sensitive data transmitted between the client 120, the client application 118, and/or the cloud computing environment. The system 100 provides this security by implementing a mechanism that rotates a PKI public-private key pair used to encrypt/decrypt the sensitive data. Rotation refers to the generation of a new public-private key pair used to encrypt/decrypt data by the client 120 and the client application 118. In many embodiments, the rotation is done based on a schedule and at a predetermined interval. The predetermined interval may be any unit of time, for example, minutes, hours, days, etc. In many embodiments, once the public-private key pair is rotated, it is transmitted to other components of the system 100, for example, a secure storage location 112 and a public key service module 114, and may be sent to other devices or the client 120, or retrieved from the same by the client application 118 and the client 120 to encrypt/decrypt the sensitive data being transmitted between the client 120, the client application 118, and the cloud computing environment.

In many embodiments, the system 100 may be implemented with units, modules, and sub-modules. For example, the system 100 may include a scheduler module 102, a key rotation control module 104, and a key rotation module 106. In many embodiments, the scheduler module 102 may be coupled to the key rotation control module 104. The key rotation control module 104 may be coupled to the key rotation module 106. The scheduler module 102, the key rotation control module 104, and the key rotation module 106 can further be coupled to other components of the system 100. For example, in many embodiments, these other components may be a database 108, the secure storage location 112, and the public key service module 114. For example, the key rotation control module 104 may be coupled to the database 108. The key rotation module 106 can also be coupled to the database 108. The key rotation module 106 can further be coupled to the secure storage location 112 and can also be coupled to the public key service module 114.

In many embodiments, the modules and the other components of the system 100 can all be implemented within the cloud computing environment. How the system 100 operates will now be discussed with respect to FIG. 1. For the purposes of discussion, and with respect to FIG. 1, it will be assumed that the client application 118 is integrated with the cloud computing environment such that the system 100 can generate a public-private key pair for the client application 118. Integrated refers to the client application 118 being connected to the cloud computing environment, such that the client application 118 is able to call on functions of the cloud computing environment, via an API or otherwise, to generate and obtain the public-private key pair.

In many embodiments, the system 100 can operate by having the scheduler module 102 initiate a call to the key rotation control module 104 to determine whether to initiate generation of a public-private key pair for the client application 118. In many embodiments, the scheduler module 102 may be implemented as a service of the cloud computing environment. For example, if the cloud computing environment is AWS, the scheduler module 102 may be implemented as a service of Amazon CloudWatch. In many embodiments where the cloud computing environment is Google Cloud, the scheduler module 102 may be implemented as a service of Google Cloud Monitoring. The aforementioned platforms are merely exemplary and not limiting to the cloud computing environment of the system 100.

Continuing with the example, in many embodiments, the scheduler module 102 can initiate the call to the key rotation control module 104 by, for example, transmitting a signal or parameter, or making a function call via an API to the key rotation control module 104 to notify the key rotation control module 104 that it is time to check whether a public-private key pair of the client application 118 needs to be rotated. In many embodiments, the scheduler module 102 can initiate the call based on a predetermined interval. As previously indicated, the predetermined interval may be any unit of time, for example, minutes, hours, days, etc. For example, the call may be every five minutes, ten minutes, thirty minutes, etc., depending on the bandwidth of the system 100 to make such calls to the key rotation control module 104. The predetermined interval may be customized by an administrator or a developer of the system 100.

In many embodiments, as a result of the call to the key rotation control module 104, the key rotation control module 104 can query the database 108, which in many embodiments store a product configuration for the client application 118. The key rotation control module 104 refers to a service of the cloud computing environment or a software code implemented in the cloud computing environment, that allows the determination of whether to initiate generation of the public-private key pair for the client application 118. In many embodiments, the key rotation control module 104 may be implemented as a serverless function of the cloud computing environment.

A serverless function refers to anonymous functions of the cloud computing environment that may be initiated or called to perform a task. The benefit of using serverless functions of the cloud computing environment is that the company or institution implementing the system 100 does not have to implement infrastructure or hardware to perform the task and can rely on the cloud computing environment for doing so. Additionally, this relieves the company or institution of performing the administrative duties of managing the underlying compute resources for implementing the task. This simplifies the architecture and code implementations that the company or institution implements in designing and deploying the system 100. For example, in many embodiments where the cloud computing environment is AWS, the key rotation control module 104 may be implemented in AWS Lambda, where the code or instructions for performing the functions of the key rotation control module 104 are implemented in AWS Lambda.

Continuing with the example, and as previously mentioned, in many embodiments, based on the call from the scheduler module 102, the key rotation control module 104 can query the database 108 and access the product configuration for the client application 118. In many preferred embodiments, the rotation control module 104 can perform only read functions when querying the database 108.

The product configuration refers to settings associated with the client application 118. For the purposes of discussion, it is assumed that any client application 118 that uses the system 100 has an accompanying product configuration, which sets forth one or more variables, or parameters that may be stored as table entries in the database 108, and which indicates properties of the client application 118. In many embodiments, the product configuration may be installed and/or entered into the database as a part of an onboarding process when the client application 118 is being integrated with the cloud computing environment. Further details regarding the onboarding process and what variables or parameters are included in the product configuration will be discussed further below. For the purposes of discussion with respect to FIG. 1, it is assumed that the product configuration includes at least five variables or parameters indicating: (1) how often (i.e., the frequency) the public-private key pair for the client application 118 is to be rotated (i.e., generated), which is referred to as a key rotation period, (2) for how long the public-private key pair are valid (i.e., the duration for which the public-private key pair is accessible by the client application 118 and the client 120), which is referred to as a key validity period, (3) which machine can access the private key, which is referred to as an access type and access setting, (4) which client can access the public key, which is referred to as a user client id, and (5) key parameters which describe what type of public-private keys should generated. The key rotation period and the key validity period are related, and the value of one depends on the other due to the constraints of the system 100. For example, the key rotation period and the key validity period may follow one or more of the predetermined constraints:

- The key validity period is greater than the key rotation period.
- The key validity period is equal to or greater than the key rotation period plus an amount of time. In many preferred embodiments, the amount of time is 1800 seconds.
- The key validity period is equal to or greater than a minimum amount of time. In many preferred embodiments, the minimum amount of time is 7200 seconds.
- The key validity period is equal to or less than a maximum amount of time. In many preferred embodiments, the maximum amount of time is 15552000 seconds.

In many embodiments, the key rotation control module 104, by querying the database 108 and accessing the product configuration can determine whether to initiate rotation of the public-private key pair for the client application 118. This may be done based on determining whether a difference between a last time a previous public-private key pair was generated for the client application 118 and a current time is greater than the key rotation period. For the purposes of discussion, it is also assumed that the last time a previous public-private key pair was generated for the client application 118 is known and was saved to the product configuration. It is also assumed that the current time may be obtained by a service of the cloud computing environment. The current time refers to a time at which the scheduler module 102 makes a call to the key rotation control module 104 to determine whether to initiate generation of a public-private key pair.

In many embodiments, based on determining that the difference between the last time the previous public-private key pair was generated for the client application 118 and the current time is greater than the key rotation period, the key rotation control module 104 can initiate generation of the public-private key pair by, for example, generating and transmitting a control signal to the key rotation module 106, requesting rotation of the public-private key pair. In many embodiments, once the key rotation control module 104 generates and transmits the control signal to the key rotation module 106, control is passed to the key rotation module 106 to generate the public-private key pair. The control signal may be a signal or parameter, or a function call via an API, to the key rotation module 106

The key rotation module 106, similar to the key rotation control module 104, refers to a service of the cloud computing environment or a software code implemented in the cloud computing environment, that allows the generation of the public-private key pair for the client application 118. In many embodiments, the key rotation module 106 may be implemented as a serverless function of the cloud computing environment. The key rotation module 106 can generate the public-private key pair through any number of known methods for generating public-private key pairs. For example, in many embodiments, the public-private key pair may be Elliptic Curve (EC) keys, RSA keys, or digital signature keys. Thus, the public-private key pair may be generated by having the key rotation module 106 implement instructions or code to generate EC keys, RSA keys, or digital signature keys. Such instructions and code are known in the art and may be implemented by using open source libraries such as OpenSSL to generate a public-private key pair for EC, RSA, or digital signature keys. An example code to generate the public-private key pair is shown below. The example code generates the public-private key pair using the Java™ programming language using the JDK Security API. This, however, is exemplary and other programming languages can be used:

```
package org.kodejava.example.security;
import java.security.*;
import java.util.Base64;
public class GenerateKeyPairDemo {
public static void main(String[ ] args) {
try {
KeyPairGenerator keyGen = KeyPairGenerator.getInstance("DSA", "SUN");
// Initialize KeyPairGenerator.
SecureRandom random = SecureRandom.getInstance("SHA1PRNG", "SUN");
keyGen.initialize(1024, random);
// Generate Key Pairs, a private key and a public key.
KeyPair keyPair = keyGen.generateKeyPair( );
PrivateKey privateKey = keyPair.getPrivate( );
PublicKey publicKey = keyPair.getPublic( );
Base64.Encoder encoder = Base64.getEncoder( );
System.out.println("privateKey: " + encoder.encodeToString(privateKey.getEncoded( )));
System.out.println("publicKey: " + encoder.encodeToString(publicKey.getEncoded( )));
} catch (NoSuchAlgorithmException e) {
e.printStackTrace( );
} catch (NoSuchProviderException e) {
e.printStackTrace( );
}
}
}
```

Continuing with the example, in many embodiments, in order to generate the public-private key pair, additional information may be needed. For example, in the case where the public-private key is RSA keys, the additional information includes an RSA key size in bits that needs to be specified. In another example, if the public-private key pair is EC keys, an EC curve to be used needs to be specified. In many embodiments, this additional information may be specified by the developer of the client application 118 and saved as part of the product configuration, and may be obtained by the key rotation module 106 from the database 108, via querying the database 108 during the public-private key pair generation process.

In many embodiments, once the key rotation module 106 rotates (i.e., generates) the keys, the key rotation module 106 can further update the database 108 with a timestamp indicating when the public-private key pair was generated for the client application 118. The timestamp replaces the previous value or parameter of the product configuration indicating the last time the previous public-private key pair was generated for the client application 118. In this way, the system 100 can determine, in the future, whether a further public-private key pair will need to be generated for the client application 118 for subsequent iterations of calls to the key rotation control module 104 by the scheduler module 102.

In many embodiments, once the key rotation module 106 generates the public-private key pair, the key rotation module 106 can further generate a notification indicating that the public-private key pair has been generated. For example, the key rotation module 106 can call one or more services of the cloud computing environment to generate a notification to a user, administrator, or developer of the system 100, or the client application 118. For example, in many embodiments where the system 100 is implemented in AWS, the key rotation module 106 can generate a signal notifying a service such as Amazon Simple Notification Service (SNS) to further notify a user, administrator, developer of the system 100, or the client application 118 that the public-private key pair has been generated and that it may be retrieved. In this way, key rotations performed by the system 100 may be tracked and monitored and allow the components of the system 100 to take action based on the key rotations.

In many embodiments, once the key rotation module 106 generates the public-private key pair, the key rotation module 106 can allow transmitting of the keys generated to the other components of the system 100. For example, in many embodiments, the key rotation module 106 can transmit the private key associated with the public-private key pair to the secure storage location 112. In many preferred embodiments, the key rotation module 106 can interact with the secure storage location 112 via write-only functions. The key rotation module 106 can further transmit the public key associated with the public-private key pair to the public key service module 114.

The secure storage location 112 refers to a database or repository that can securely store the private key associated with the public-private key pair. In many embodiments, the secure storage location 112 may be implemented as an enterprise secret management solution, for example, HashiCorp's Vault, which is an open source solution known in the art, to which the private key is transmitted and stored in a secure location.

The public key service module 114 refers to a service of the cloud computing environment, or a server integrated into the cloud computing environment, that facilitates the exchange of information, particularly the public keys, between the client 120 and the cloud computing environment, including data and protocol translations where necessary, to ensure intended information is exchanged between the client 120 and the cloud computing environment. In many embodiments, the public key is transmitted and stored in a location within the public key service module 114.

In many embodiments where the private and public keys are transmitted to the secure storage location 112 and the public key service module 114, the private key and the public key can remain in the respective locations where they are stored on these components until they are ready to be retrieved and/or accessed by the client 120 and the client application 118, to be utilized in encrypting/decrypting sensitive data. Due to the fact that the public-private key pair expires due to their key validity period, they remain accessible by the client 120 and/or the client application 118 until the expiration. That is, in order to be utilized to encrypt/decrypt sensitive data, they must be used within their key validity period.

By way of example, the client 120 and the client application 118 can utilize the generated public-private key pair in the following manner to encrypt/decrypt sensitive data. In many embodiments, where the client 120 wants to transmit sensitive data to the client application 118 so that the client application 118 can perform some task on the sensitive data and/or to further transmit the sensitive data to the cloud computing environment to perform some task on the sensitive data, the client 120 can first generate a request to the public key service module 114 to obtain the public key. In many embodiments, the client 120 can generate the request by using a public key service API 116 or other similar interface to generate the request. In many preferred embodiments, the client 120 can only request the public key associated with the specific client application 118 as configured as part of the onboarding. In other words, it can only obtain the public keys it has access to from the public key service module 114 based on the request. The request may be, for example, a function call to the public key service module 114, in which a parameter is passed identifying the client application 118 and requesting that the public key generated for the client application 118 be sent back to the client 120.

In many embodiments, based on receiving the request, the public key service module 114 can transmit the public key generated to the client 120. The module 114 will only return the public key if the client 120 is authorized to receive the key associated with the specific client application 118 as configured as part of the onboarding. Once the client 120 receives the public key, the client can use the public key to encrypt the sensitive data being transmitted to the client application 118 and send the public key along with the sensitive data, along with any other accompanying parameters or data to the client application 118.

In many embodiments, the client application 118 can receive the encrypted data and the public key. Once received, the client application 118 can generate a request to the secure storage location 112, by using a secure storage location API 110 (or other similar interface) to obtain the private key associated with the public key. In many preferred embodiments, the client application 118 can interact with the secure storage location 112 via read-only functions. In other words, the client application 118 can only obtain the private keys via the request. In many embodiments, the request may be a function call to the secure storage location 112, in which a parameter is passed identifying the client application 118, the client 120, or a combination thereof, and requesting that the private key generated for the client application 118 be sent back to the client application 118. Based on receiving the request, the secure storage location 112 can transmit the private key to the client application 118. Once received the client application 118 can use the private key to decrypt the encrypted data. How public-private key pairs are used to decrypt encrypted data is known in the art and will not be described in detail. For the purposes of discussion, it may be assumed that any number of known techniques may be used. In many embodiments, once decrypted, the client application 118 can perform its tasked function on the sensitive data and/or transmit the sensitive data to the cloud computing environment to perform tasks on the sensitive data.

In many embodiments of the system 100, in addition to having the scheduler module 102 make calls to the key rotation control module 104 based on a schedule and at a predetermined interval, the system 100 can further include a manual override option in which the system 100, via an API or an interface, can allow a user of the system 100 to request the initiation of generation of the public-private key pair for a client application 118 outside of the scheduled or predetermined interval. The user of the system 100 may be, for example, an administrator or developer of the system 100. The request can take the form of the control signal similar to the control signal transmitted by the key rotation control module 104 to the key rotation module 106. The control signal can trigger the key rotation module 106 to generate the public-private key pair and bypass the querying of the database 108 that is performed by the key rotation control module 104. In this way, users of the system 100 can have further control over the key generation process and can generate a public-private key pair in the event a security violation is determined, that can compromise the security of the sensitive data, and limit the impact of any such violation.

It should be noted that the system 100 described in FIG. 1 while discussed with respect to a client 120 and a client application 118, is not limited to such an embodiment. This is merely done for ease of description. The system 100 can further be scaled to support many clients and client applications. For example, in implementations where multiple clients and client applications utilize the system 100 to generate a public-private key pair, different client and/or client application identifiers, for example different alphanumeric identifiers, may be generated at the onboarding stage for each of the clients and/or client applications, identifying each client and/or client application, and associated with each of the clients and/or client applications, such that the system 100 can generate a public-private key pair for each of the clients and/or client applications and use the identifiers to associate each client and/or client application to its public-private key pair when generating and/or transmitting the public-private key.

The modules and services described in FIG. 1 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It has been discovered that the system 100 described above significantly improves the state of the art from previous systems for encryption key management because it introduces novel architecture for security key rotation in a cloud computing environment. The architecture allows client applications built on a cloud computing environment to utilize PKI technologies without having to implement any of the PKI infrastructure themselves. This significantly improves development time for client applications because it offloads security functions for the client applications to the cloud computing environment, thereby simplifying development and implementation of client applications built for the cloud computing environment.

It has been further discovered that the system 100 described above significantly improves the state of the art because it implements an encryption key management architecture that may be implemented once and used across many clients and/or client applications. This significantly reduces the costs in implementing encryption systems across multiple clients and client applications because it allows one encryption key management system to be build and utilized by many end users.

It has been further discovered that the system 100 described above significantly improves the state of the art because it implements an encryption key management architecture that significantly limits the impact of data breaches for cloud based applications, in which sensitive data is compromised, because it limits access to the sensitive data for a limited period of time due to the public-private keys being frequently rotated so that public-private key pairs need to be obtained frequently to access the sensitive data.

Onboarding Process for Client Applications

Figure 2:
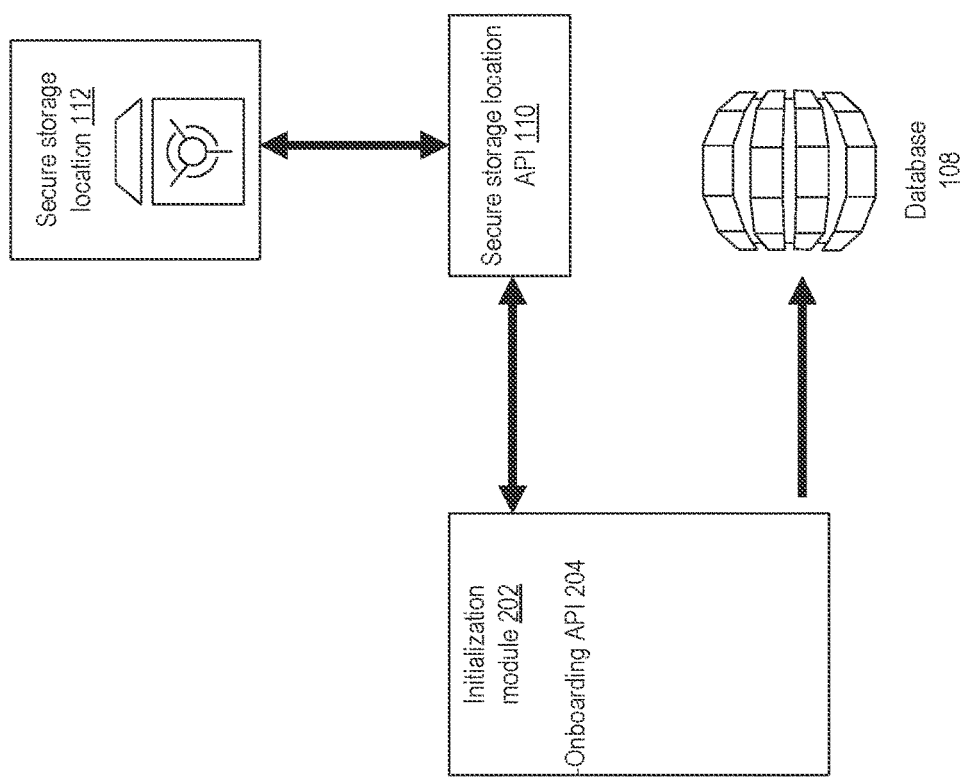
FIG. 2 is an example system for initializing a product configuration of a client application in an embodiment of the present disclosure.

FIG. 2 shows an example system 200 for initializing a product configuration of a client application in an embodiment of the present disclosure. The system 200 may be used as part of the onboarding process mentioned with respect to FIG. 1, in which the client application 118 is integrated into the cloud computing environment. For the purposes of FIG. 2, it is assumed that system 200 performs the initialization of the product configuration prior to the system 100 being used to generate a public-private key pair for a client application 118.

In many embodiments, system 200 may be implemented with modules and sub-modules. For example, in many embodiments, the system 200 can include an initialization module 202. The initialization module 202 can be coupled to one or more of the other components of the cloud computing environment, for example, the secure storage location 112 or the database 108, and allow at least part of the integration of the client application 118 into the cloud environment.

In many embodiments, the initialization module 202 can allow this integration by allowing an owner of client application 118 to interface with the cloud computing environment to set one or more parameters or variables for the product configuration for the client application 118, so public-private keys can be generated for the system 100. In many embodiments, not all the parameters or variables for the product configuration need to be provided by the owner of client application 118, and may be further generated and written to the product configuration by the other components of the system 200, for example, the secure storage location 112 in conjunction with an onboarding API 204, or by an administrator or developer of the system 200.

In many embodiments, the initialization module 202 can include, for example, an onboarding API 204 that allows the owner of client application 118 and/or other components of the system 200 to input the parameters or variables. The parameters or variables to be input have no set schema and may be customized by an administrator or developer of the system 200. Typical parameters or variables are listed in Table 1 along with a brief description of what they represent:

TABLE 1

| Parameter or Variable | Type | Description |
| --- | --- | --- |
| product_id | string | This parameter can identify the client application 118 and may be specified by the client application 118. |
| public_key_product_id | string | This parameter may be used to request public keys from the public key service module 114. It may be used to map multiple clients 120 to public keys of a client application 118. |
| owner_client_id | string | This parameter can identify a particular client application 118. |
| lockbox_id | string | This parameter can identify a secure location of the secure storage location 112, where the private key is stored. This parameter may be specified by the secure storage location 112 and written to the product configuration by the secure storage location 112 once the client application 112 is integrated into the cloud computing environment. |
| key_type | string | This parameter can specify the type of public-private key pair to be created. For example, it can specify EC keys or RSA keys. |
| key_use | string | This parameter can specify the use case of the public-private key pair. For example, it can specify whether the key pair is used to encrypt/decrypt data or to be used as a digital signature. |
| curve | string | In a variety of embodiments where EC keys are to be generated, this parameter can specify the EC curve to use to generate the EC keys. |
| algorithm | string | This parameter can specify what algorithm is used to generate the key pair. For example, this can specify any number of Asymmetric-key algorithms or Symmetric-key algorithms that are available in generating the public-private key pair. This parameter can change based on the 'key_type' and 'key_use' parameters. |
| key_size | number | In many embodiments where RSA keys are generated, this parameter can specify the RSA key size in bits. In many preferred embodiments, the value of this parameter may be larger than 2048 and divisible by 8. This field may only be required when 'key_type' parameter is set to 'RSA'. |
| key_validity_period | number | This parameter can specify the period of time for which a key pair is valid after rotation. |
| key_rotation_period | number | This parameter can specify the period of time after which a key must be rotated. |
| last_refreshed_time | string | This parameter can specify the timestamp at which the key was last rotated, as an integer value of milliseconds. In preferred embodiments, the value of this parameter defaults to 0 when the client application 118 is initially integrated into the cloud computing environment. |
| access_type | string | In many embodiments, where the secure storage location 112 is implemented as an enterprise secret management solution, this parameter may be used to specify the access type used to access the secrets used to secure the private key. Allowed values can include, for example, 'Kubernetes', 'EC2', and 'IAM'. |
| access_settings | string | This parameter can specify the access settings which correspond to the specified 'access_type'. |
| user_client_ids | string | This parameter can specify a list of clients, for example client 120, which will have access to read a public key from the public key service module 114. |
| create_ts | string | This parameter can specify a time at which the client application 118 was created, as an integer value of milliseconds. The current time populates this field at the time the client application 118 is integrated into the cloud computing environment. |
| update_ts | string | This parameter can specify the time at which the client application 118 was last modified (i.e., has its code modified), as an integer value of milliseconds. The current time populates this field at whenever an update is made to the client application 118 in the cloud computing environment. |
| delete_ts | string | This parameter can specify the time at which the client application 118 is deleted from or de-integrated from the cloud computing environment, as an integer value of milliseconds. The current timestamp populates this field at deletion time, otherwise the value defaults to 0 at the time the client application 118 is integrated into the cloud computing environment. |

The aforementioned parameters or values listed in Table 1 are not meant to be limiting. Other parameters may be configured by an administrator or developer of the system 200. In many embodiments, once the product configuration parameters are initialized, the product configuration may be saved to and stored on the database 108. The product configuration can then be used by the system 100 of FIG. 1 to generate the public-private key pair for a client application 118.

Methods of Operation

Figure 3:
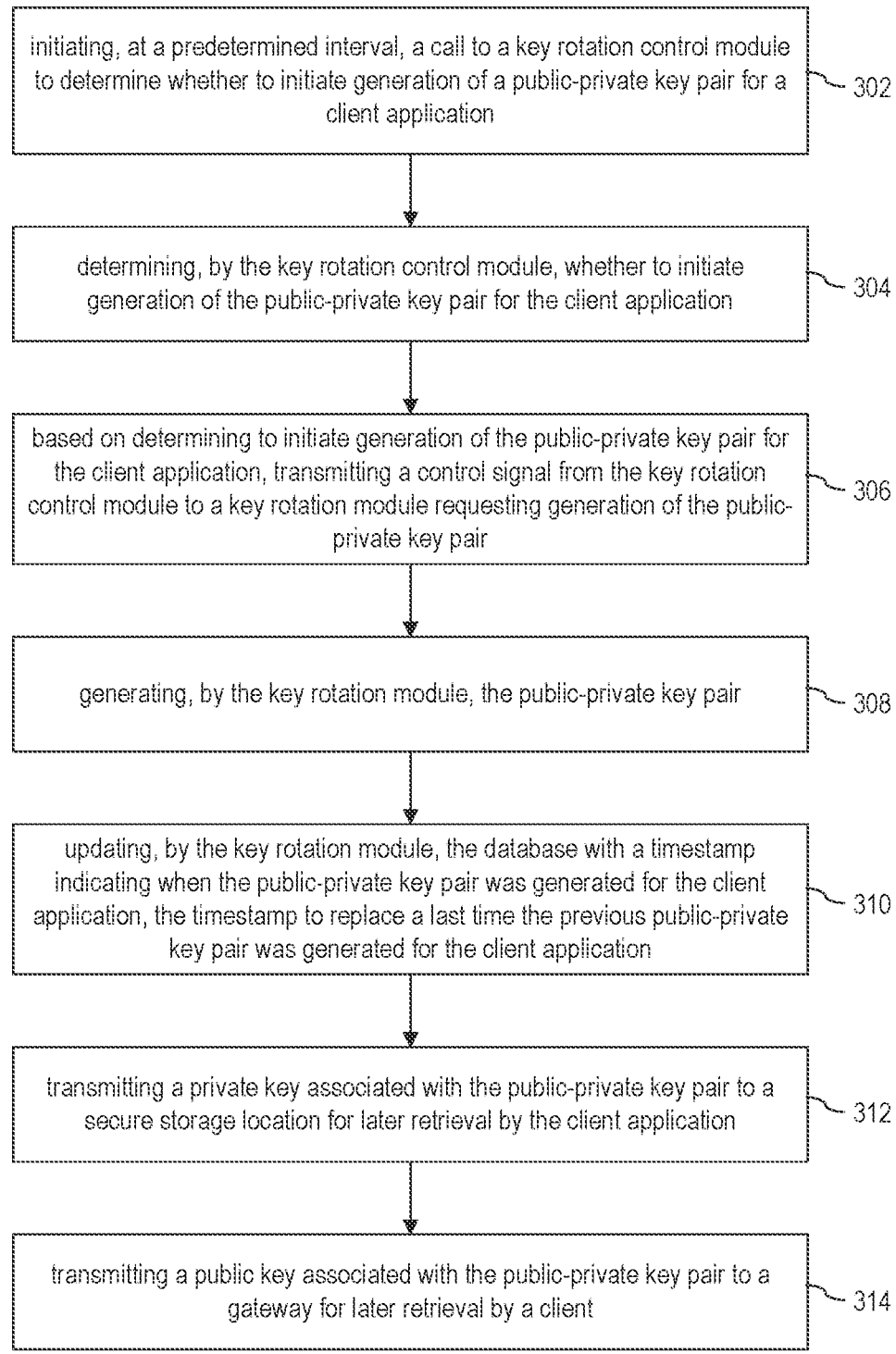
FIG. 3 is an example method of operating the system in an embodiment of the present disclosure.

FIG. 3 shows an example method 300 of operating the system in an embodiment of the present disclosure. The method 300 includes, initiating, at a predetermined interval, a call to a key rotation control module 104 to determine whether to initiate generation of a public-private key pair for a client application 118, as shown in 302. The method 300 further includes, determining, by the key rotation control module 104, whether to initiate generation of the public-private key pair for the client application 118, as shown in 304. Based on determining to initiate generation of the public-private key pair for the client application 118, the method 300 further includes transmitting a control signal from the key rotation control module 104 to a key rotation module 106 requesting generation of the public-private key pair, as shown in 306. The method 300 further includes, generating, by the key rotation module 106, the public-private key pair, as shown in 308. The method further includes, updating, by the key rotation module 106, the database 108 with a timestamp indicating when the public-private key pair was generated for the client application 118, the timestamp to replace a last time the previous public-private key pair was generated for the client application 118, as shown in 310. The method 300 further includes, transmitting a private key associated with the public-private key pair to a secure storage location 112 for later retrieval by the client application 118, as shown in 312. The method 300 further includes, transmitting a public key associated with the public-private key pair to a public key service module 114 for later retrieval by a client 120, as shown in 314.

Figure 4:
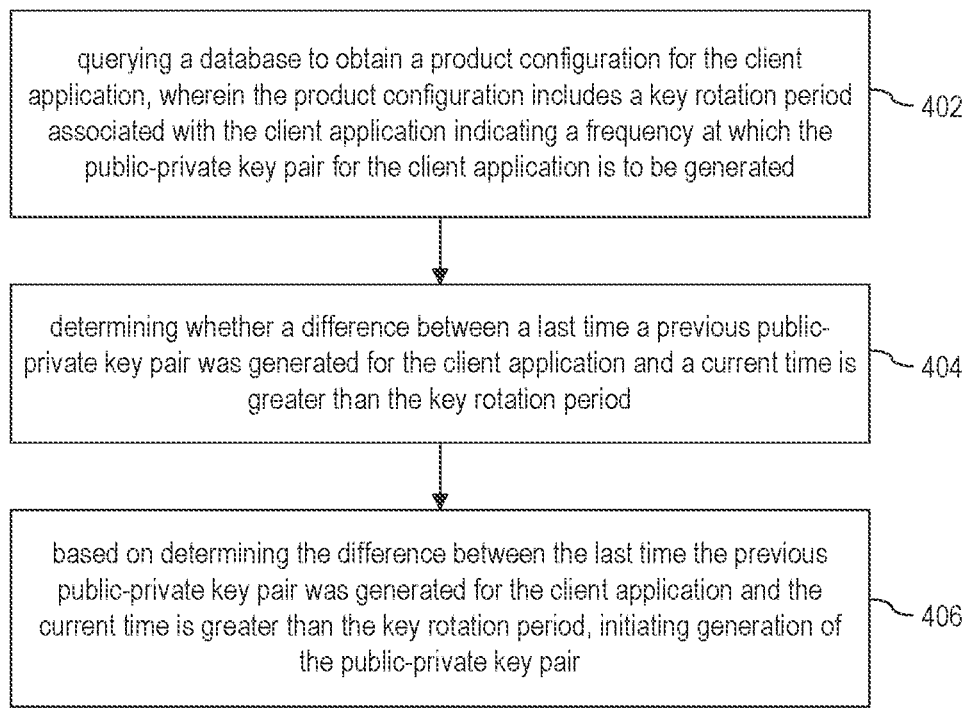
FIG. 4 is an example method of determining whether to initiate generation of a public-private key pair for a client application in an embodiment of the present disclosure.

FIG. 4 shows an example method 400 of determining whether to initiate generation of a public-private key pair for the client application 118 in an embodiment of the present disclosure. The method 400 includes, querying a database 108 to obtain a product configuration for the client application 118, wherein the product configuration includes a key rotation period associated with the client application 118 indicating a frequency at which the public-private key pair for the client application 118 is to be generated, as shown in 402. The method 400 further includes, determining whether a difference between a last time a previous public-private key pair was generated for the client application 118 and a current time is greater than the key rotation period, as shown in 404. Based on determining the difference between the last time the previous public-private key pair was generated for the client application 118 and the current time is greater than the key rotation period, the method 400 further includes, initiating generation of the public-private key pair, as shown in 406.

The operations of methods 300 and 400 are performed, for example, by system 100, in accordance with embodiments described above.

Components of the System

Figure 5:
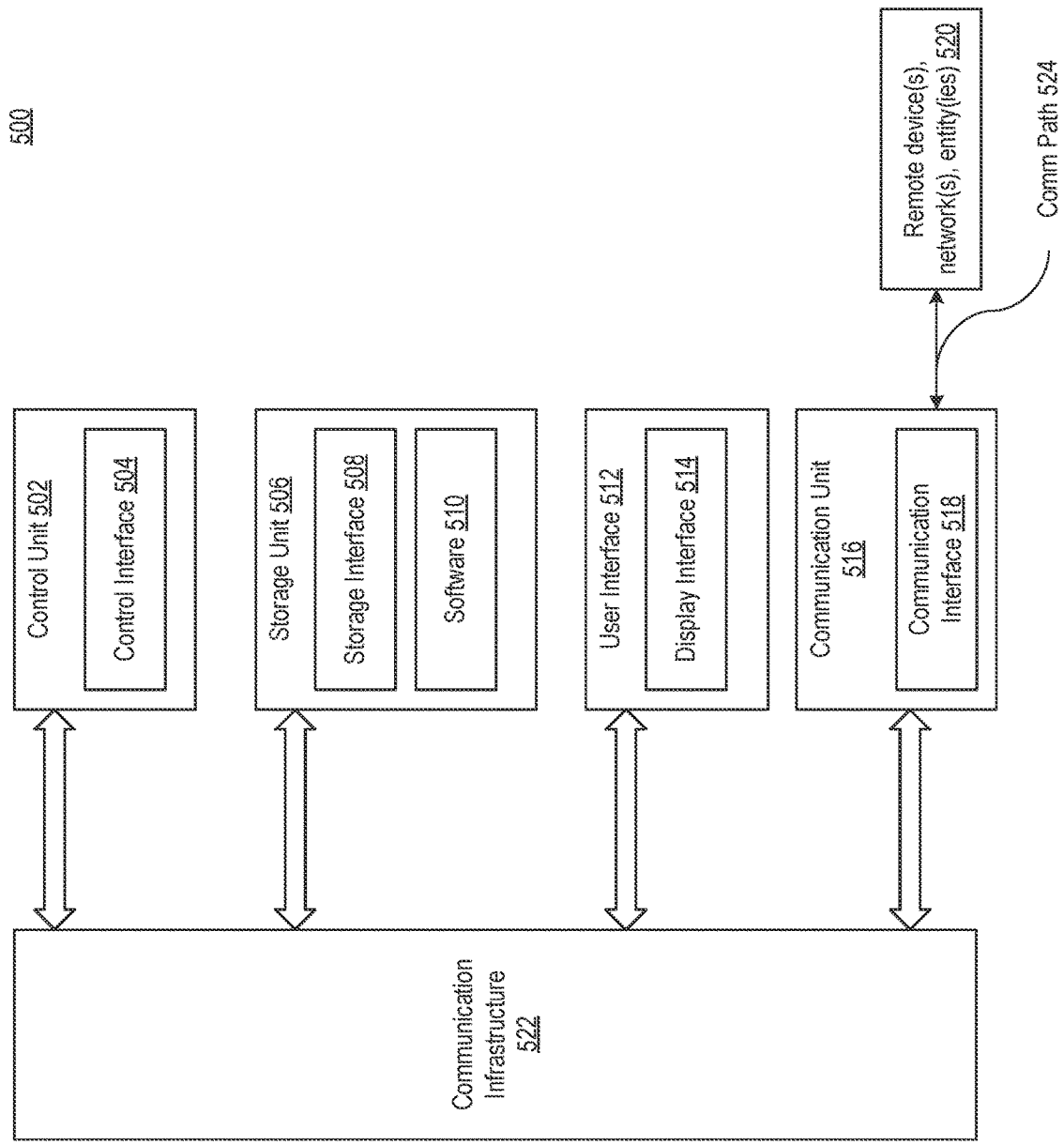
FIG. 5 is an example architecture of the components implementing the system in an embodiment of the present disclosure.

FIG. 5 shows an example architecture 500 of the components implementing systems 100 and 200 in embodiments of the present disclosure. In many embodiments, the components may include a control unit 502, a storage unit 506, a communication unit 516, and a user interface 512. The control unit 502 may include a control interface 504. The control unit 502 may execute a software 510 to provide some or all of the intelligence of systems 100 and 200. The control unit 502 may be implemented in a number of different ways. For example, the control unit 502 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 504 may be used for communication between the control unit 502 and other functional units or devices of systems 100 and 200. The control interface 504 may also be used for communication that is external to the functional units or devices of systems 100 and 200. The control interface 504 may receive information from the functional units or devices of systems 100 and 200, or from remote devices 520, or may transmit information to the functional units or devices of systems 100 and 200, or to remote devices 520. The remote devices 520 refer to units or devices external to systems 100 and 200.

The control interface 504 may be implemented in different ways and may include different implementations depending on which functional units or devices of systems 100 and 200 or remote devices 520 are being interfaced with the control unit 502. For example, the control interface 504 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 504 may be connected to a communication infrastructure 522, such as a bus, to interface with the functional units or devices of systems 100 and 200 or remote devices 520.

The storage unit 506 may store the software 510. For illustrative purposes, the storage unit 506 is shown as a single element, although it is understood that the storage unit 506 may be a distribution of storage elements. Also for illustrative purposes, the storage unit 506 is shown as a single hierarchy storage system, although it is understood that the storage unit 506 may be in a different configuration. For example, the storage unit 506 may be formed with different storage technologies forming a memory hierarchical system including different levels of caching, main memory, rotating media, or off-line storage. The storage unit 506 may be a volatile memory, a nonvolatile memory, an internal memory, an external memory, or a combination thereof. For example, the storage unit 506 may be a nonvolatile storage such as nonvolatile random access memory (NVRAM), Flash memory, disk storage, or a volatile storage such as static random access memory (SRAM) or dynamic random access memory (DRAM).

The storage unit 506 may include a storage interface 508. The storage interface 508 may be used for communication between the storage unit 506 and other functional units or devices of systems 100 and 200. The storage interface 508 may also be used for communication that is external to systems 100 and 200. The storage interface 508 may receive information from the other functional units or devices of systems 100 and 200 or from remote devices 520, or may transmit information to the other functional units or devices of systems 100 and 200 or to remote devices 520. The storage interface 508 may include different implementations depending on which functional units or devices of systems 100 and 200 or remote devices 520 are being interfaced with the storage unit 506. The storage interface 508 may be implemented with technologies and techniques similar to the implementation of the control interface 504.

The communication unit 516 may allow communication to devices, components, modules, or units of systems 100 and 200 or to remote devices 520. For example, the communication unit 516 may permit the system 100 to communicate between its components such as the scheduler module 102, the key rotation control module 104, the key rotation module 106, the database 108, the secure storage location 112, and the public key service module 114. The communication unit 516 may further permit the devices of systems 100 and 200 to communicate with remote devices 520 such as an attachment, a peripheral device, or a combination thereof through a communication path 524, such as a wireless or wired network.

The communication path 524 may span and represent a variety of networks and network topologies. For example, the communication path 524 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the communication path 524. Cable, Ethernet, digital subscriber line (DSL), fiber optic lines, fiber to the home (FTTH), and plain old telephone service (POTS) are examples of wired communication that may be included in the communication path 524. Further, the communication path 524 may traverse a number of network topologies and distances. For example, the communication path 524 may include direct connection, personal area network (PAN), local area network (LAN), metropolitan area network (MAN), wide area network (WAN), or a combination thereof.

The communication unit 516 may also function as a communication hub allowing systems 100 and 200 to function as part of the communication path 524 and not be limited to be an end point or terminal unit to the communication path 524. The communication unit 516 may include active and passive components, such as microelectronics or an antenna, for interaction with the communication path 524.

The communication unit 516 may include a communication interface 518. The communication interface 518 may be used for communication between the communication unit 516 and other functional units or devices of systems 100 and 200 or to remote devices 520. The communication interface 518 may receive information from the other functional units or devices of systems 100 and 200, or from remote devices 520, or may transmit information to the other functional units or devices of the system 100 or to remote devices 520. The communication interface 518 may include different implementations depending on which functional units or devices are being interfaced with the communication unit 516. The communication interface 518 may be implemented with technologies and techniques similar to the implementation of the control interface 504.

The user interface 512 may present information generated by systems 100 and 200. In many embodiments, the user interface 512 allows a user of systems 100 and 200 to interface with the devices of systems 100 and 200 or remote devices 520. The user interface 512 may include an input device and an output device. Examples of the input device of the user interface 512 may include a keypad, buttons, switches, touchpads, soft-keys, a keyboard, a mouse, or any combination thereof to provide data and communication inputs. Examples of the output device may include a display interface 514. The control unit 502 may operate the user interface 512 to present information generated by systems 100 and 200. The control unit 502 may also execute the software 510 to present information generated by systems 100 and 200, or to control other functional units of systems 100 and 200. The display interface 514 may be any graphical user interface such as a display, a projector, a video screen, or any combination thereof.

The above detailed description and embodiments of the disclosed systems 100 and 200 are not intended to be exhaustive or to limit the disclosed systems 100 and 200 to the precise form disclosed above. While specific examples for systems 100 and 200 are described above for illustrative purposes, various equivalent modifications are possible within the scope of the disclosed systems 100 and 200, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods 300 and 400, and systems 100 and 200 are cost-effective, highly versatile, and accurate, and may be implemented by adapting components for ready, efficient, and economical manufacturing, application, and utilization. Another important aspect of embodiments of the present disclosure is that it valuably supports and services the historical trend of reducing costs, simplifying systems, and/or increasing performance.

These and other valuable aspects of the embodiments of the present disclosure consequently further the state of the technology to at least the next level. While the disclosed embodiments have been described as the best mode of implementing systems 100 and 200, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the scope of the invention should be determined not by the embodiments illustrated, but by the appended claims and their equivalents.

What is claimed is:

1. A computer implemented method for security key rotation in a cloud computing environment, the method comprising:
   determining, by a key rotation control module, whether to initiate generation of a public-private key pair for a client application based on:
   querying a database to obtain a product configuration for the client application, wherein the product configuration includes a key rotation period associated with the client application indicating a frequency at which the public-private key pair for the client application is to be generated, determining whether a difference between a last time a previous public-private key pair was generated for the client application and a current time is greater than the key rotation period, based on determining the difference between the last time the previous public-private key pair was generated for the client application and the current time is greater than the key rotation period, initiating generation of the public-private key pair;

generating, by a key rotation module, the public-private key pair; and transmitting, by one or more computing devices, a private key associated with the public-private key pair to a secure storage location for later retrieval by the client application.

2. The method of claim 1, further comprising transmitting, by the one or more computing devices, a public key associated with the public-private key pair to a public key service for later retrieval by a client associated with the client application.

3. The method of claim 1, further comprising updating, by the key rotation module, the database with a timestamp indicating when the public-private key pair was generated for the client application, the timestamp to replace the last time the previous public-private key pair was generated for the client application.

4. The method of claim 1, wherein the product configuration further includes a key validity period associated with the key rotation period, wherein the key validity period indicates a duration for which the public-private key pair is accessible by the client application and a client.

5. The method of claim 1, wherein the public-private key pair is: Elliptic Curve (EC) keys, RSA keys, or digital signature keys.

6. The method of claim 1, wherein the key rotation control module and the key rotation module are implemented as serverless functions of the cloud computing environment.

7. The method of claim 1, further comprising:

receiving, by the one or more computing devices, a request by a user to initiate generation of the public-private key pair; and based on receiving the request, initiating, by the key rotation control module, generation of the public-private key pair.

8. A non-transitory computer readable medium including instructions for security key rotation in a cloud computing environment, the instructions comprising:

determining, by a key rotation control module, whether to initiate generation of a public-private key pair for a client application based on:

querying a database to obtain a product configuration for the client application, wherein the product configuration includes a key rotation period associated with the client application indicating a frequency at which the public-private key pair for the client application is to be generated, determining whether a difference between a last time a previous public-private key pair was generated for the client application and a current time is greater than the key rotation period, based on determining the difference between the last time the previous public-private key pair was generated for the client application and the current time is greater than the key rotation period, initiating generation of the public-private key pair;

generating, by a key rotation module, the public-private key pair; and transmitting, by one or more computing devices, a private key associated with the public-private key pair to a secure storage location for later retrieval by the client application.

9. The non-transitory computer readable medium of claim 8, wherein the instructions further comprise transmitting, by the one or more computing devices, a public key associated with the public-private key pair to a public key service for later retrieval by a client associated with the client application.

10. The non-transitory computer readable medium of claim 8, wherein the instructions further comprise updating, by the key rotation module, the database with a timestamp indicating when the public-private key pair was generated for the client application, the timestamp to replace the last time the previous public-private key pair was generated for the client application.

11. The non-transitory computer readable medium of claim 8, wherein the product configuration further includes a key validity period associated with the key rotation period, wherein the key validity period indicates a duration for which the public-private key pair is accessible by the client application and a client.

12. The non-transitory computer readable medium of claim 8, wherein the public-private key pair is: Elliptic Curve (EC) keys, RSA keys, or digital signature keys.

13. The non-transitory computer readable medium of claim 8, wherein the key rotation control module and the key rotation module are implemented as serverless functions of the cloud computing environment.

14. The non-transitory computer readable medium of claim 8, wherein the instructions further comprise:

receiving, by the one or more computing devices, a request by a user to initiate generation of the public-private key pair; and based on receiving the request, initiating, by the key rotation control module, generation of the public-private key pair.

15. A computing system for security key rotation in a cloud computing environment comprising:

a memory of the cloud computing environment to store instructions;

one or more processors of the cloud computing environment, coupled to the memory, configured to process the stored instructions to:

determine, by a key rotation control module, whether to initiate generation of a public-private key pair for a client application based on:

query a database to obtain a product configuration for the client application, wherein the product configuration includes a key rotation period associated with the client application indicating a frequency at which the public-private key pair for the client application is to be generated, determine whether a difference between a last time a previous public-private key pair was generated for the client application and a current time is greater than the key rotation period, based on determining the difference between the last time the previous public-private key pair was generated for the client application and the current time is greater than the key rotation period, initiate generation of the public-private key pair;

generate, by a key rotation module, the public-private key pair; and transmit a private key associated with the public-private key pair to a secure storage location for later retrieval by the client application.

16. The computing system of claim 15, wherein the one or more processors are further configured to transmit a public key associated with the public-private key pair to a public key service for later retrieval by a client associated with the client application.

17. The computing system of claim 15, wherein the one or more processors are further configured to update the database with a timestamp indicating when the public-private key pair was generated for the client application, the timestamp to replace the last time the previous public-private key pair was generated for the client application.

18. The computing system of claim 15, wherein the product configuration further includes a key validity period associated with the key rotation period, wherein the key validity period indicates a duration for which the public-private key pair is accessible by the client application and a client.

19. The computing system of claim 15, wherein the public-private key pair is: Elliptic Curve (EC) keys, RSA keys, or digital signature keys.

20. The computing system of claim 15, wherein the key rotation control module and the key rotation module are implemented as serverless functions of the cloud computing environment.

* * * * *